United States Patent [19]
Olson

[11] Patent Number: 5,290,051
[45] Date of Patent: Mar. 1, 1994

[54] LOAD-UNLOADING SHOE FOR WHEELED HANDTRUCKS

[76] Inventor: Harlan F. Olson, 4885 S. Jason, Englewood, Colo. 80110

[21] Appl. No.: 28,665

[22] Filed: Feb. 4, 1993

Related U.S. Application Data

[63] Continuation of Ser. No. 583,570, Sep. 14, 1990, abandoned, which is a continuation of Ser. No. 302,804, Jan. 30, 1989, abandoned.

[51] Int. Cl.$^5$ ............................................. B62B 1/06
[52] U.S. Cl. ................................ 280/47.27; 414/490
[58] Field of Search ............. 280/47.27, 47.28, 47.29; 414/444, 446, 490

[56] References Cited

U.S. PATENT DOCUMENTS

| | | | |
|---|---|---|---|
| 2,316,614 | 4/1943 | Pierce | 414/451 |
| 2,452,258 | 10/1948 | Nielsen | 414/490 |
| 2,649,219 | 8/1953 | Nielsen | 414/490 |
| 2,838,193 | 6/1958 | Statton | 298/2 |
| 3,486,651 | 12/1969 | Gottinger | 414/444 |
| 3,844,431 | 10/1974 | Crawford | 280/47.27 |

*Primary Examiner*—Eric Culbreth
*Attorney, Agent, or Firm*—Richard W. Hanes

[57] ABSTRACT

A load-unloading subassembly for use with a wheeled handtruck characterized by a pivotal and slidable connection between the sideframe elements of the load-unloading frame and the corresponding upright elements of the handtruck frame which connections cooperate with a scissor link pivotally interconnecting the two to cause a push-off shoe at the lower end of the load-unloading subframe to move substantially horizontally across the load-carrying platform of the handtruck to separate a load therefrom when the subassembly frame is rotated.

3 Claims, 4 Drawing Sheets

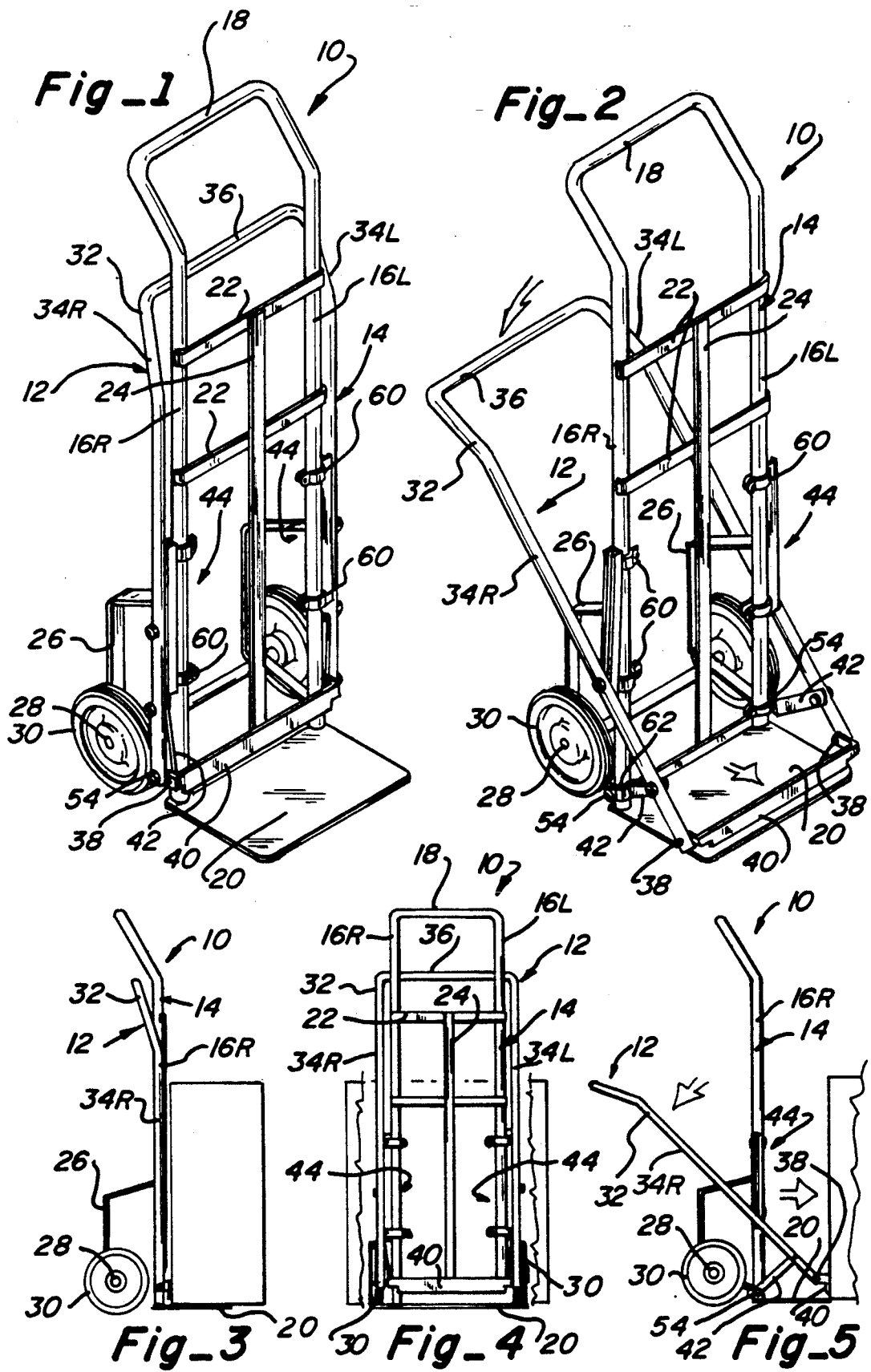

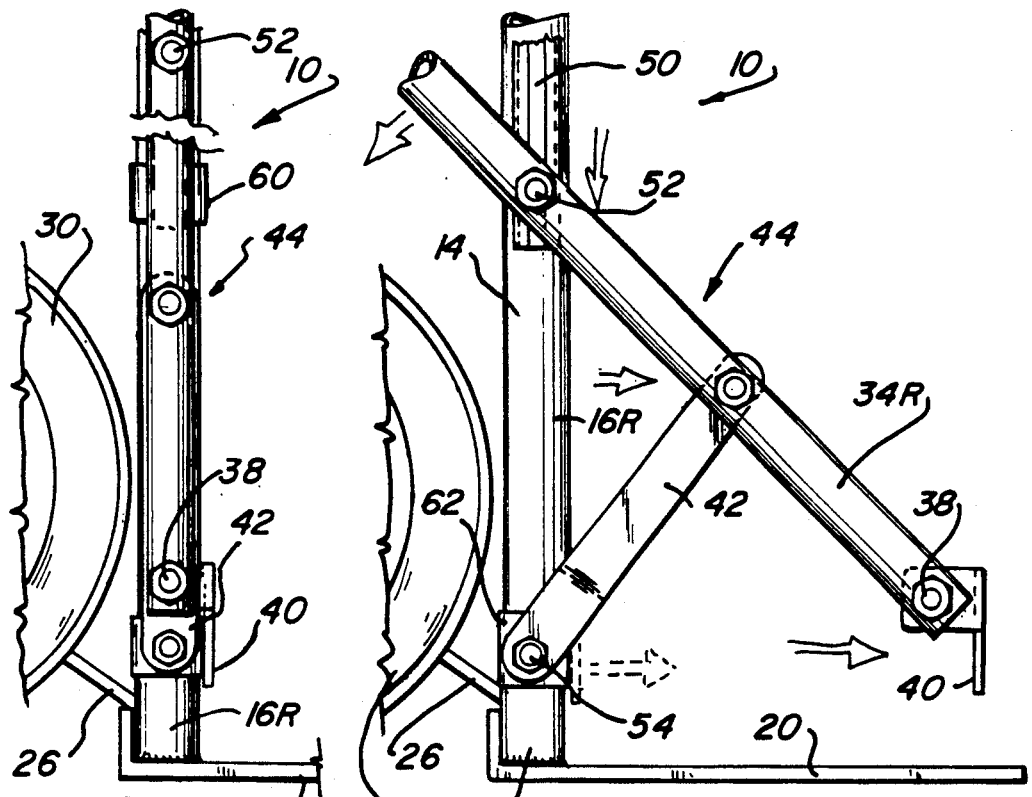
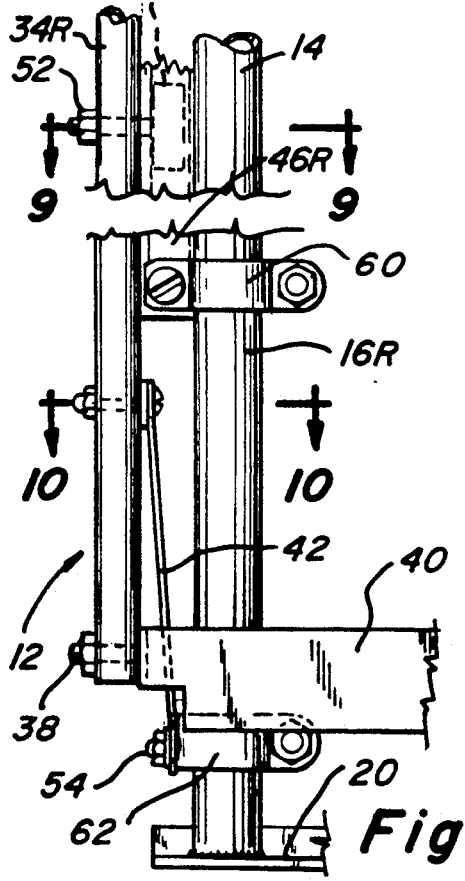
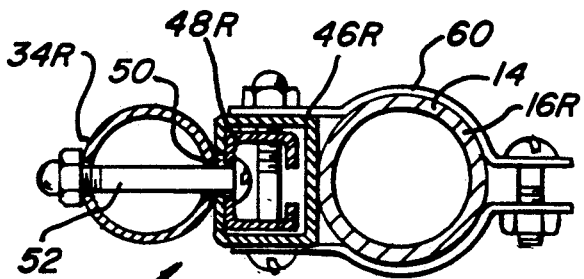
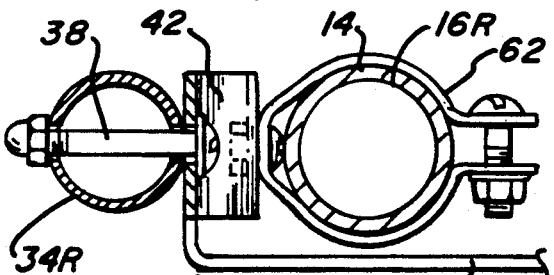

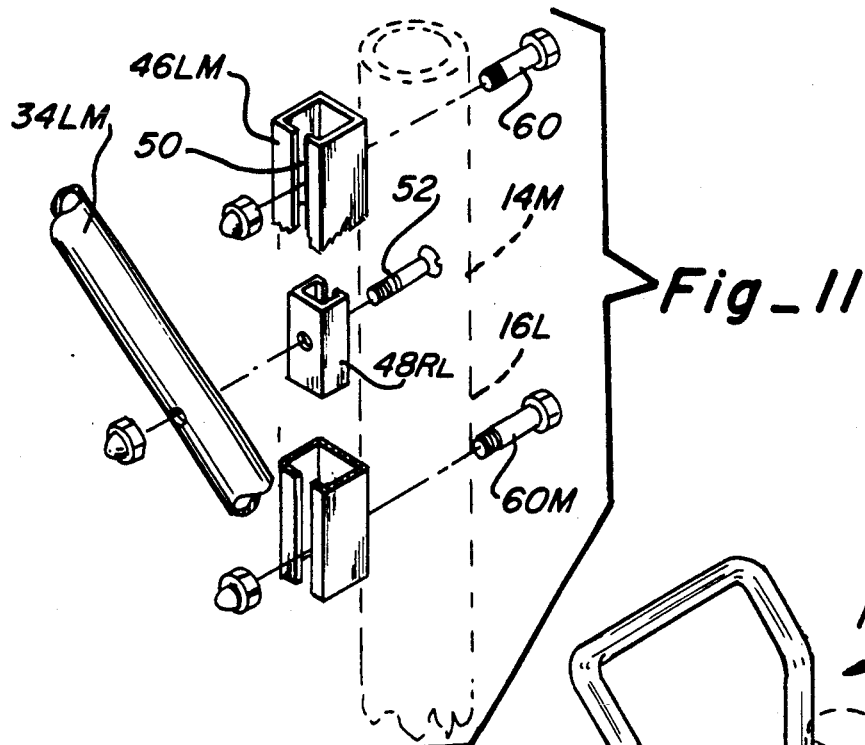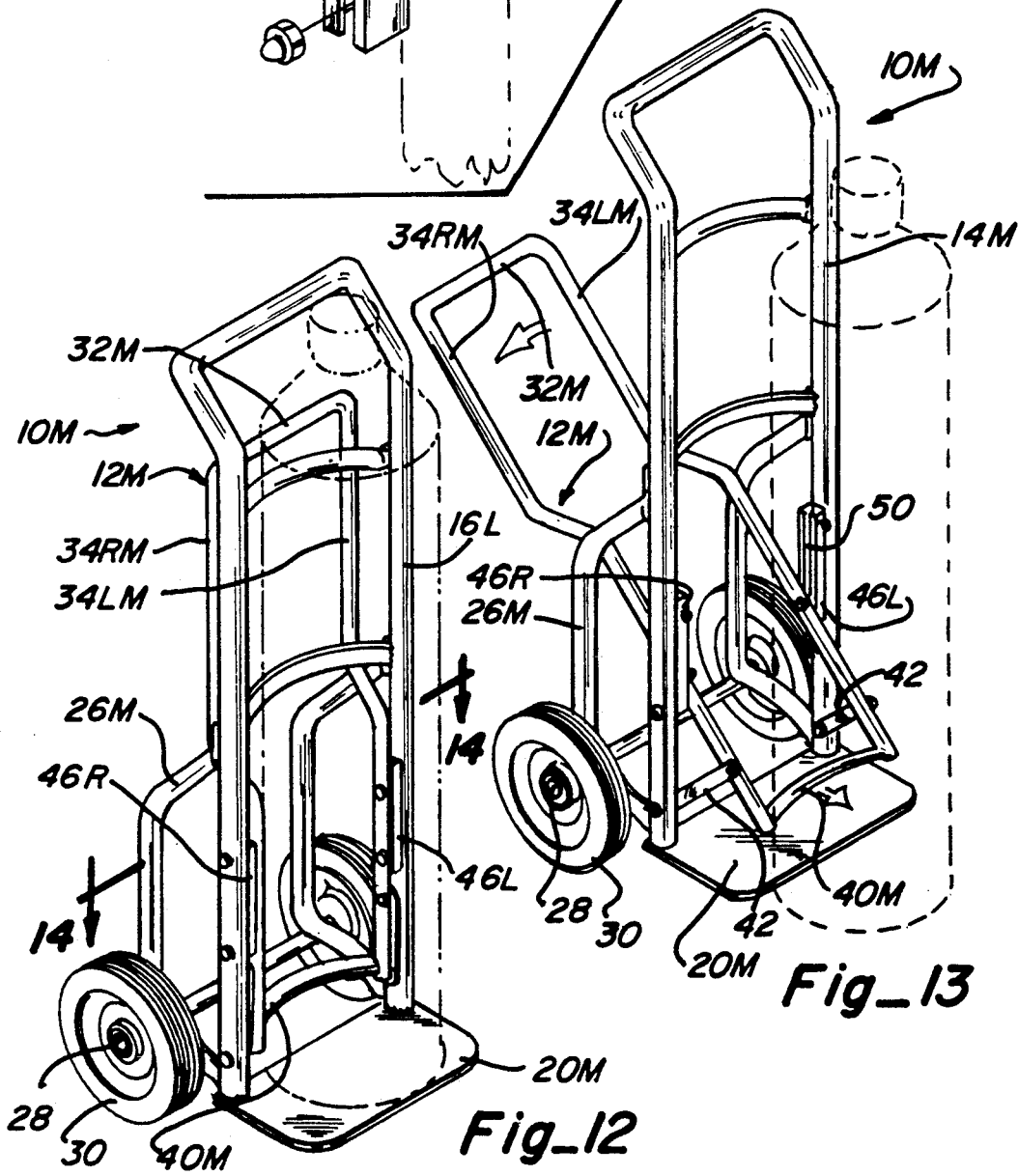

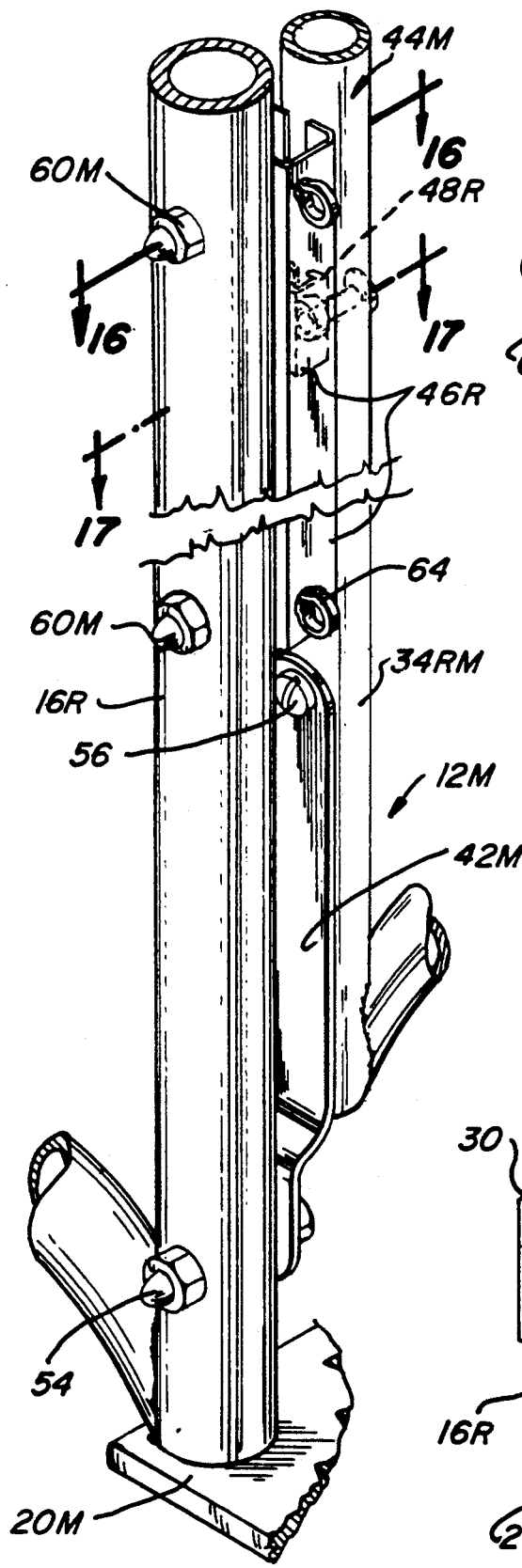
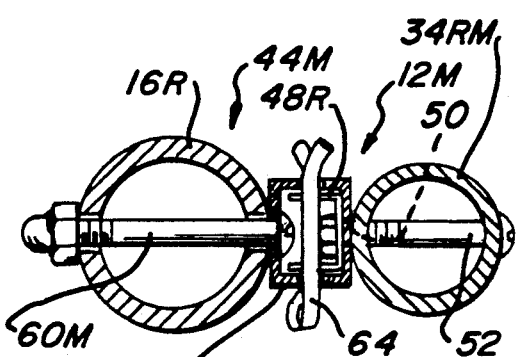
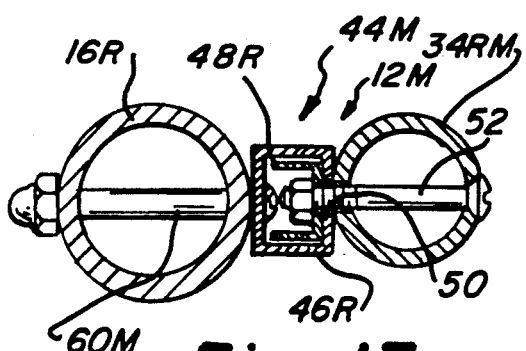
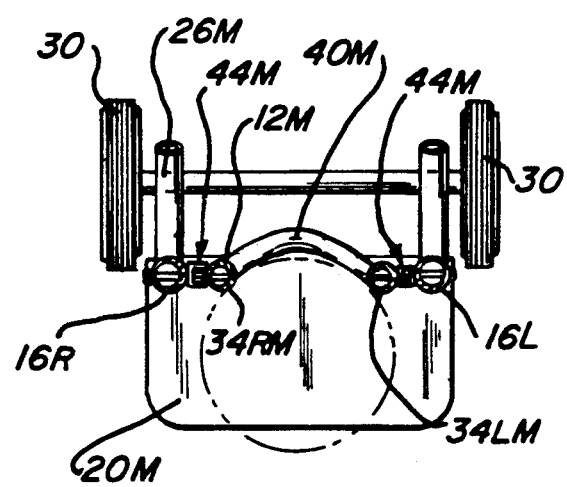

LOAD-UNLOADING SHOE FOR WHEELED HANDTRUCKS

This application is a continuation of a continuation application (U.S. Ser. No. 07/583,570, filed Sep. 14, 1990, now abandoned) of U.S. Ser. No. 07/302,804, filed Jan. 30, 1989, and now abandoned.

BACKGROUND OF THE INVENTION

The present invention relates to improvements in the prior art devices for unloading loads from two-wheeled handtrucks.

Probably the most common of all tools for moving relatively light loads is the two-wheeled handtruck. Delivery people use them constantly to transfer boxes and other packaged materials from their delivery vehicle into the lands of the customer. Even homeowners find them convenient as a means of getting the trash out to the curb or into the alley where it can be picked up and disposed of.

In commercial application especially, the delivery man is called upon to repeatedly load and unload the handtruck which stresses the back and may even result in its being injured. While it is easier by far to use a handtruck as opposed to carrying the loads from place to place by hand, nevertheless, there remain certain drawbacks which make the procedure less than completely satisfactory.

DESCRIPTION OF THE RELATED ART

The prior art is replete with devices for unloading handcarts. One of the earliest is the U.S. patent to Randall U.S. Pat. No. 528,443 which discloses a foot-operated pusher for sliding the load off the platform of a two-wheeled handtruck. Another early one is the spring-actuated unloading device invented by McCoy and shown in his 1912 U.S. Pat. No. 1,027,557. More recent versions of the foot and spring-actuated handtrunk unloaders can be found in the U.S. Pat. Nos. 2,838,193 and 3,844,431 issued to Statton and Crawford, respectively. Nielsen's U.S. Pat. No. 2,452,258 also shows a foot-actuated unloader for a two-wheeled handtruck.

Of noticeably different construction is the two-wheeled handtruck shown in Pierce's U.S. Pat. No. 2,316,614 which deals with the considerably more complex problem of loading the truck as opposed to unloading it. The main problem being addressed by the prior art remains, of course, that of unloading the truck, not loading it.

Of special significance in terms of applicant's invention forming the subject matter hereof are the U.S. patents to Nielson U.S. Pat. No. 2,649,219; Gottinger U.S. Pat. No. 3,486,651; Gorman U.S. Pat. No. 2,953,267; Miller U.S. Pat. No. 3,712,496; and Ring U.S. Pat. No. 3,878,958, all of which show devices for unloading two-wheeled handtrucks that are lever-actuated and include some type of auxiliary frame pivotally attached to the main frame of the truck for movement relative to the latter between a retracted and essentially stowed position into an extended operative one adapted to push the load off the platform of the cart that supports same.

The simple units like that of Gottinger result in the push-off shoe moving upwardly in an arc against the back of the load, thus necessitating the use of rollers. The Gorman device does not use rollers, but the push-off shoe also moves arcuately upwardly, scraping up the back side of the lowermost articles in the load. The action of the Miller unloader is much like the two mentioned above except for the fact that he provides for raising and lowering of his roller-equipped push-off shoe. The Nielson (219) hand truck uses a foot operated lever to move the push-off shoe, which is undesirable for several reasons. The operator is off balance when operating the lever and because the operation of the arm starts from a substantially vertical or upright position the leverage is not fully available until the foot lever rotates into a more horizontal position. The Nielson push-off bar also moves in an arc with the attendant disadvantages of relative motion between the bar and the load.

SUMMARY OF THE INVENTION

The handtruck unloading mechanism of the present invention has a push-off shoe that moves horizontally over, but is unsupported by the load-support platform, and is thus different from those devices described above. This action is accomplished by a unique shoe-actuating linkage wherein the auxiliary frame which is used to move the shoe forward toward the load and back into retracted position is slidably and pivotally attached to the frame of the truck in such a manner that its axis of pivotal movement can move down with respect to the frame of the truck as the shoe is made to push forwardly and to move upwardly up as it is retracted, thus defining horizontal movement of the shoe without having to support it on the platform. Actuation is as simple as any of the aforementioned load-unloading mechanisms and simpler than most. It can easily be constructed as a permanent part of the handtruck or, alternatively, as an accessory.

By extending and retracting the push-off shoe without having it either slide or roll up the back of the lowest article in the stack being unloaded, delicate goods can be handled without danger of damaging the cartons or their contents plus the unloading is made easier by the fact that a straight push of the load does not involve frictional engagement between the load and the push pad. In the device of the present invention the mechanical linkages which are subsequently described result in a moment arm extending below the level of the axis of the hand cart wheels resulting in a multiplied force to roll the wheels of the cart rearwardly away from and out from under the load instead of a devise which attempts to push the load forwardly off of the platform, resulting in the tendency to tip the load stack forward and spill it.

It is, therefore, the principal object of the present invention to provide a novel and improved load-unloading mechanism for two-wheeled handtrucks which has a highly leveraged push plate which moves horizontally to a low point on the stacked load and results in the handcart actually moving backward out from under the load without application of any force which would tend to topple a stacked load.

A second object is to provide a device of the type aforementioned which can be added as an accessory to existing handtrucks or, alternatively, built in as a permanent feature thereof.

Another objective of the within-described invention is that of providing a linkage for moving the push-off shoe of such an apparatus in a manner whereby the likelihood that the load will suffer any damage during the unloading operation is greatly reduced.

Further objects are to provide a handtruck unloader which is simple, easy to operate, lightweight, safe, relatively inexpensive and versatile.

Other objects will be in part apparent and in part pointed out specifically hereinafter in connection with the description of the drawings that follows.

BRIEF DESCRIPTION OF THE DRAWINGS

FIG. 1 is a perspective view showing a conventional two-wheeled handtruck equipped with the load-unloading device of the present invention as an add-on accessory, the latter having been shown in its retracted inoperative position;

FIG. 2 is a perspective view like FIG. 1 and to the same scale but differing therefrom in that the unloader is shown in its extended operative position;

FIG. 3 is a right side elevation of the assembly of FIG. 1 but to a reduced scale and showing a load in place on the load-supporting platform of the handtruck;

FIG. 4 is a front elevation of the loaded handtruck as seen in FIG. 3 and to the same scale, portions of the load having been broken away to reveal the handtruck;

FIG. 5 is a right side elevation similar to FIG. 3 and to the same scale but differing from the latter in that the unloading mechanism is shown in extended operative position having reacted with the mass of the load to push the platform rearwardly from under the load;

FIG. 6 is a greatly enlarged fragmentary detail showing the track in which the auxiliary frame rides up and down the sideframe elements of the handtruck frame, portions having been broken away to conserve space;

FIG. 7 is a fragmentary detail much like FIG. 6 and to the same scale but differing therefrom in that the unloading mechanism is shown extended instead of retracted;

FIG. 8 is a fragmentary detail to the same scale as FIGS. 6 and 7 showing one of the many ways in which such a load-unloading mechanism can be detachably connected to an existing handtruck as an accessory;

FIG. 9 is a fragmentary section taken along line 9—9 of FIG. 8 to a somewhat further enlarged scale;

FIG. 10 is a fragmentary section taken along line 10—10 of FIG. 8 and to the same scale as FIG. 9;

FIG. 11 is a fragmentary perspective view showing an alternative load-unloading subassembly in which the tracks are mounted inside the frame of the handtruck rather than outside thereof as was the case in FIGS. 1-10, inclusive, the scale being somewhere between that of FIGS. 8 and 9;

FIG. 12 is a perspective view similar to FIG. 1 and to the same scale but showing a modified version of the unloading mechanism in which the tracks are mounted inside the frame members of the handtruck and both the truck and unloader are adapted to handle cylindrical loads like, for example, large gas bottles;

FIG. 13 is similar to FIG. 2, both showing the unloading mechanism fully actuated to back the truck up from underneath the load;

FIG. 14 is a sectional view of the assembly shown in FIG. 12 and to the same scale taken along line 14—14 of FIG. 12;

FIG. 15 is a fragmentary perspective view much like FIG. 11 but to a still larger scale showing the same track and linkage subassembly as the latter figure;

FIG. 16 is a fragmentary section taken along line 16—16 of FIG. 15;

FIG. 17 is a fragmentary section like FIG. 16 but taken along line 17—17 of FIG. 15.

DESCRIPTION OF THE PREFERRED EMBODIMENTS

Referring next to the drawings for a detailed description of the present invention and, initially, to FIGS. 1-10 for this purpose, reference numeral 10 has been selected to broadly designate a conventional two-wheeled handtruck and numeral 12 to similarly connote the load-unloading subassembly carried thereby. The handtruck in the particular form illustrated has an inverted generally U-shaped main frame 14 made up of a transversely-spaced pair of uprights 16R and 16L joined together across the top by an integrally-formed handle member 18. A load-carrying platform 20 projects forwardly from the lower ends of the uprights which are joined together by the latter. Crosspieces 22 join the uprights together at vertically-spaced intervals as shown and a central support member 24 bridges the spaces between these crosspieces.

As illustrated, a subframe 26 extends rearwardly of the main frame and carries an axle 28 to the ends of which are journalled the wheels 30. Subframes of the general type shown are commonplace in handtrucks although they form no part of the present invention. When the platform 20 rests on the ground, the plane of the platform 20, extended rearwardly, is substantially tangent to the circumference of the wheels 30. The particular form of handtruck shown in FIGS. 1-10 is the type generally designed to carry rectangular loads such as, for example, cartons, stacked materials, etc., and as such it has a wide platform 20, widely-spaced uprights 16R, 16L and a generally planar backrest defined by the crosspieces 22 and center support 24.

Turning attention briefly to what is shown in FIGS. 11-16, by way of contrast to what has been described above, the handtruck 10M is of the relatively narrower type designed to transport cylindrical loads rather than rectangular ones. As such, the uprights 16R and 16L of the modified frame are moved closer together and the platform 20M is correspondingly narrower. The wheels 30 and axle 28 remain much the same but a slightly modified subframe 26M mounting the latter has been shown. As illustrated, the crosspieces 40M connecting the uprights are curved rather than straight and the central support member has been eliminated altogether. For purposes of the present description, however, the main difference lies in the fact that the load-unloading subassembly 12 of FIGS. 1-10 lies outside the uprights 16L, 16R of the handtruck frame; whereas, in the embodiment of FIGS. 11-17 the corresponding load-unloading subassembly 12M lies inside the latter. Thus, except for certain reference which will yet have to be made to certain components of the handtrucks like, for example, the uprights that form part of the main frame, the load-carrying platform and other incidentals, little more need be said concerning the construction of these commonplace load-transporting mechanisms since to do so would unnecessarily complicate what is otherwise a rather simple, but nonetheless unique, addition to the latter. Accordingly, the attention is, once again, directed to the carton-carrying embodiment of FIGS. 1-10 for a detailed description of its load-unloading feature identified by reference numeral 12.

It, like the handtruck itself, has an inverted generally U-shaped frame 32 made up of right and left sideframe elements 34R and 34L connected together at their upper ends by a crossframe member 36 that defines a handle. At the lower extremities of these sideframe elements 34R and 34L is a push-off shoe 40 attached to the latter by a pair of pivot pins 38 (see FIGS. 6-8 and 10). A link 42 cooperating with a sliding connection that has been indicated in a general way by reference numeral 44 essentially completes the load-unloading subassembly 12, the details of the latter having been shown most clearly in FIGS. 6-10 to which reference will now be made.

Attached to the outside of uprights 16R and 16L of the main handtruck frame 24 will be found a pair of outwardly-opening vertically-slotted generally box-shaped tracks or rails 46R and 46L within which are mounted for slidable movement therealong a pair of similarly configured, but smaller followers, such as 48R, most clearly revealed in FIG. 9 as typical of both the left and right sides. The last-mentioned sliding elements are connected to one of the sideframe elements 34R or 34L through the slot 50 in the rail by a suitable fastener 52 which forms a pivot pin about which the sideframe elements are free to swing. Thus, this pivotal connection between the sideframe elements and the corresponding sliding element 48 is free to ride up and down the tracks 46 between the fully retracted inoperative position shown in FIGS. 1, 3, 4, 6 and 8 and the fully-extended operative position in which these elements are shown in FIGS. 2, 5 and 7, all due to the presence of link 42, the function of which can best be described in connection with FIGS. 6 and 7 to which reference will next be made.

Link 42 moves in the retracted or "stowed" position of the load-unloading subassembly 12 from a location between the sideframe element 34 of the latter and its counterpart of the handtruck main frame, specifically, handtruck upright 16 when the latter lie in side-by-side parallel relation to one another as can be seen most clearly in FIGS. 6 and 8. This link 42 has a lower pivotal connection 54 with the upright 16 adjacent the base of the latter and an upper pivotal connection 56 to the sideframe element 34 of the load-unloading subassembly 12 between its pivotal connection 52 to the sliding elements 48 and the pivotal connection 38 at its lower end to the push-off shoe 40. Thus, when the handle 36 is pulled back in the direction of the arrow in FIG. 2 from its upright position shown in FIGS. 1, 3 and 4 and into the load-discharging position of FIGS. 2 and 5, link 42 will move from a parallel relation extending more or less vertically between its upright and associated sideframe element into a forwardly-leaning essentially obtuse angular relation to the latter element as seen in FIG. 7. While this is taking place, the sliding elements 48 have slid down their respective tracks and the push-off shoe 40 has moved forward across the platform 20 with an essentially horizontal motion where no appreciable relative movement takes place between the latter and the load it is pushing with the shoe tilting freely so as to stay in face-to-face contact. This motion, of course, is entirely different from the arcuate sweep of the prior art push-off shoes occasioned by their fixed pivotal connections to the handtruck frame.

Before leaving FIGS. 1-10 and going on with a detailed description of the embodiment 12M of the load-unloading subassembly as seen in FIGS. 11-17, it might be well to point out that in the particular form illustrated in both embodiments, simple clamps 60 and 62 have been employed to detachably fasten the elements of the load-unloading subassembly to the main frame of the handtruck. As such, the subassembly 12 and its counterpart 12M become accessories that can be added to most handtrucks. As an alternative, of course, elements like the tracks 46L, 46R and the various pivotal connections could be welded and thus provide a permanently mounted subassembly, all of which is well within the skill of the ordinary artisan. Also, as previously noted, by replacing the handle 36 with a foot pedal (not shown) located lower down, the unit can easily be converted from hand to foot operation.

Briefly with further reference to FIGS. 11-17 where the modified form of the load-unloading assembly 12M is shown attached to a handtruck 10M of the type designed to handle cylindrical loads, a somewhat narrower inverted generally U-shaped frame 32M is used, the sideframe elements 34RM and 34LM of which fit inside rather than outside the handtruck uprights 16R and 16L as shown. The push-off shoe 40M is arcuately shaped to accommodate the cylindrical load seen in phantom lines in FIGS. 12 and 13 while differing from its counterpart 40 of the previously-described embodiment in that it is attached, rigidly or pivotally, to the sideframe elements 34 rather than being pivotally connected thereto. Link 42M is shaped somewhat differently to accommodate its inside mounting but its function remains the same. It is pivotally attached as before to one of the handtruck frame uprights 16 by a pivot-forming fastener 54 and to the corresponding sideframe element 34M of the assembly 12M by a second pivot-forming fastener 56, the details of which are most clearly revealed in FIGS. 11 and 15.

The track subassembly 44M is most clearly revealed in FIGS. 11 and 14-17 where it can be seen to once again include the box-like vertically-slotted track 46LM housing for vertical slidable movement therein the slide-forming element 48RL. Replacing brackets 60 and 62 of the earlier construction, fasteners 60M have been used to bolt the track to the handtruck frame upright 16 while fasteners 52 pivotally attach the slides 48RL to the uprights 34LM of frame 32M through slots 50 as was the case before. About the only modification in the slide subassembly 44M worthy of specific mention is the use of a cotter key extending through the track 46 as a stop to limit downward excursion of the slide and, consequently, the forward movement of the push-off shoe 40M while ejecting the load. Otherwise, the function and operation of the various elements of the load-unloading assembly 12M of FIGS. 11-17 remains the same as it was before. Here again, the tracks could, if desired, be welded or otherwise permanently attached to the handtruck frame uprights as opposed to an add-on accessory.

I claim:

1. The combination of a handtruck and a load reacting subassembly, said handtruck having a frame which includes a pair of transversely spaced uprights supporting at the lower end thereof a load-carrying platform and having a pair of wheels connected by an axle and attached to the frame, said load reacting subassembly comprising:
   a pair of sideframe elements, each sideframe element having upper and lower ends and handle means interconnecting the upper ends of each element;
   elongated straight track means carried by the uprights of the handtruck frame;
   track follower means slidably carried by the track means;
   means pivotally interconnecting the sideframe elements to the track follower means, at a point intermediate the upper and lower ends of the sideframe elements;

a shoe carried by and interconnecting the lower ends of the sideframe elements;

a pair of rigid straps each having first and second ends;

a pivotal interconnection between each of the said first strap ends and the respective uprights where the point of interconnection is in longitudinal alignment with the track means and intermediate the position of the track follower means and the plane of the load-carrying platform;

a pivotal interconnection between each of the said second strap ends and the respective sideframe elements where the point of interconnection is intermediate the point of interconnection between the sideframe elements and the track follower means and the point of interconnection between the sideframe elements and the shoe.

2. A load reacting subassembly for use in combination with a handtruck having a frame which includes a pair of transversely spaced uprights supporting at the lower ends thereof a load-carrying platform and having a pair of wheels attached to the frame by an axle, comprising;

a pair of sideframe elements, each having upper and lower ends and handle means interconnecting the upper ends;

shoe means carried by the lower ends of the sideframe elements;

means interconnecting each sideframe element with a respective one of the uprights wherein said interconnecting means includes, track means carried by the uprights in longitudinal alignment therewith, follower means slidably disposed in the track means and pivotally connected to a respective sideframe element, a pair of linkages, each having first and second ends and each being connected between an upright and a respective sideframe element, each linkage forming one side of a structural triangle whose other sides are formed by the upright and the sideframe element, a pivotal connection between each of the said first linkage ends and the respective uprights where each of the said points of connection are in longitudinal alignment with that track means carried by the respective upright and located intermediate the position of the follower means and the plane of the load carrying platform, a pivotal connection between each of the said second linkage ends and the respective sideframe elements where each of the points of connection are intermediate the point of pivotal interconnection between the sideframe element and the follower means and the point of interconnection between the sideframe element and the shoe means.

3. A load reacting subassembly for installation onto a handtruck having a frame which includes a pair of transversely spaced uprights supporting at the lower ends thereof a load-carrying platform and having a pair of wheels attached to the frame by an axle, comprising;

a pair of sideframe elements, each having upper and lower ends and handle means interconnecting the upper ends;

shoe means carried by the lower ends of the sideframe elements;

means for interconnecting each sideframe element with a respective one of the uprights wherein said interconnecting means includes, track means for attachment to the uprights in longitudinal alignment therewith, follower means slidably disposed in the track means and pivotally connected to a respective sideframe element, a pair of linkages, each having first and second ends for forming a connection between an upright and a respective sideframe element, where, upon connection, each linkage forms one side of a structural triangle whose other sides are formed by the upright and the sideframe element, a pivotal connection for connecting each of the said first linkage ends and the respective uprights where each of the said points of connection are in longitudinal alignment with the track means carried by the respective upright, where the pivotal connection is located intermediate the position of the follower means and the plane of the load carrying platform, a pivotal connection for connecting each of the said second linkage ends and the respective sideframe elements where each of the said points of connection are intermediate the point of pivotal interconnection between the sideframe element and the follower means and the point of interconnection between the sideframe element and the shoe means.

* * * * *